United States Patent [19]
Zemaitis et al.

[11] Patent Number: 5,549,722
[45] Date of Patent: Aug. 27, 1996

[54] AIR FILTER ASSEMBLIES AND A FRUSTOCONICAL AIR FILTER ELEMENT FOR USE WITH THE ASSEMBLIES

[75] Inventors: Walter A. Zemaitis; Edward A. Covington, both of Gastonia; Roland V. Lanier, Jr., Belmont; Gary U. Hovis, Dallas, all of N.C.

[73] Assignee: Dana Corporation, Toledo, Ohio

[21] Appl. No.: 366,318

[22] Filed: Dec. 30, 1994

[51] Int. Cl.⁶ ..................................................... B01D 45/08
[52] U.S. Cl. .................................. 55/463; 55/521; 55/320
[58] Field of Search .............................. 55/320, 331, 463, 55/521

[56] References Cited

U.S. PATENT DOCUMENTS

| | | | |
|---|---|---|---|
| 4,261,710 | 4/1981 | Sullivan | 55/320 |
| 4,390,354 | 6/1983 | Witchell | 55/521 |
| 4,498,915 | 2/1985 | Witchell | 55/498 |
| 5,106,397 | 4/1992 | Taroszcyk et al. | |

FOREIGN PATENT DOCUMENTS

| | | |
|---|---|---|
| 0096992A1 | 5/1983 | European Pat. Off. . |
| 2307142 | 11/1975 | France . |
| 7400250 | 1/1974 | Germany . |
| 7734475 | 11/1977 | Germany . |

OTHER PUBLICATIONS

Patents Abstracts of Japan M–646 Nov. 27, 1987 vol. 11/No. 364.

*Primary Examiner*—Robert J. Warden
*Assistant Examiner*—Theresa T. Snider
*Attorney, Agent, or Firm*—Millen White, Zelano, & Branigan, P.C.

[57] ABSTRACT

An arrangement for an air filter includes in one embodiment an air filter housing having a removable portion and a base portion with the base portion having an annular shoulder and the removable portion having a conical diffuser. A frustoconical filter element having a hollow core and annular seals at opposite ends is mounted in the housing. The annular seals have radially facing sealing surfaces which seal with the annular shoulder and with the diffuser. In another embodiment, the conical diffuser is mounted on a stanchion which is unitary with the base portion of the air filter housing. The frustoconical filter element is mounted on the base by receiving the stanchion and diffusion cone therethrough. The removable portion of the housing is then placed over the filter element and clamped to the base portion.

11 Claims, 5 Drawing Sheets

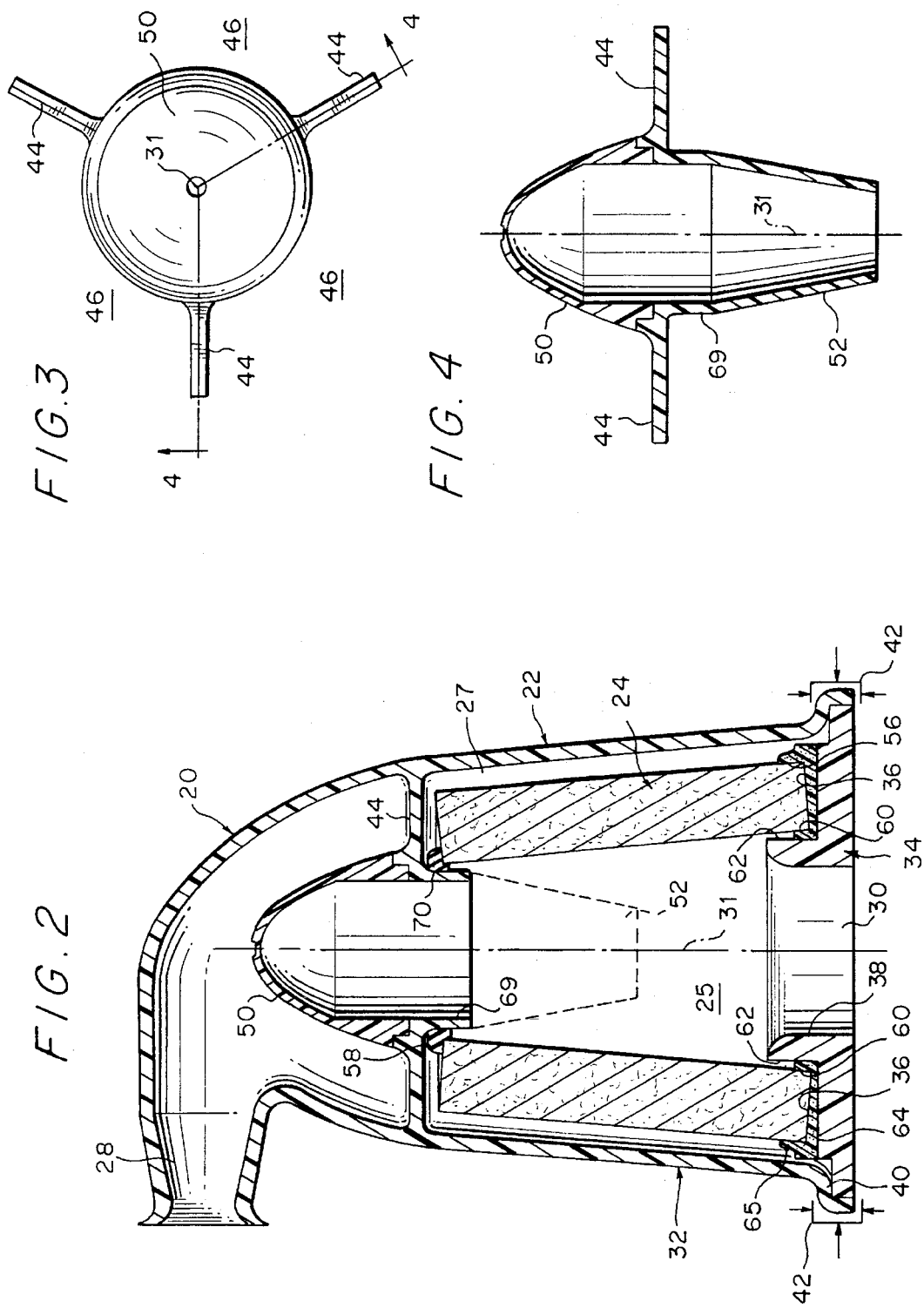

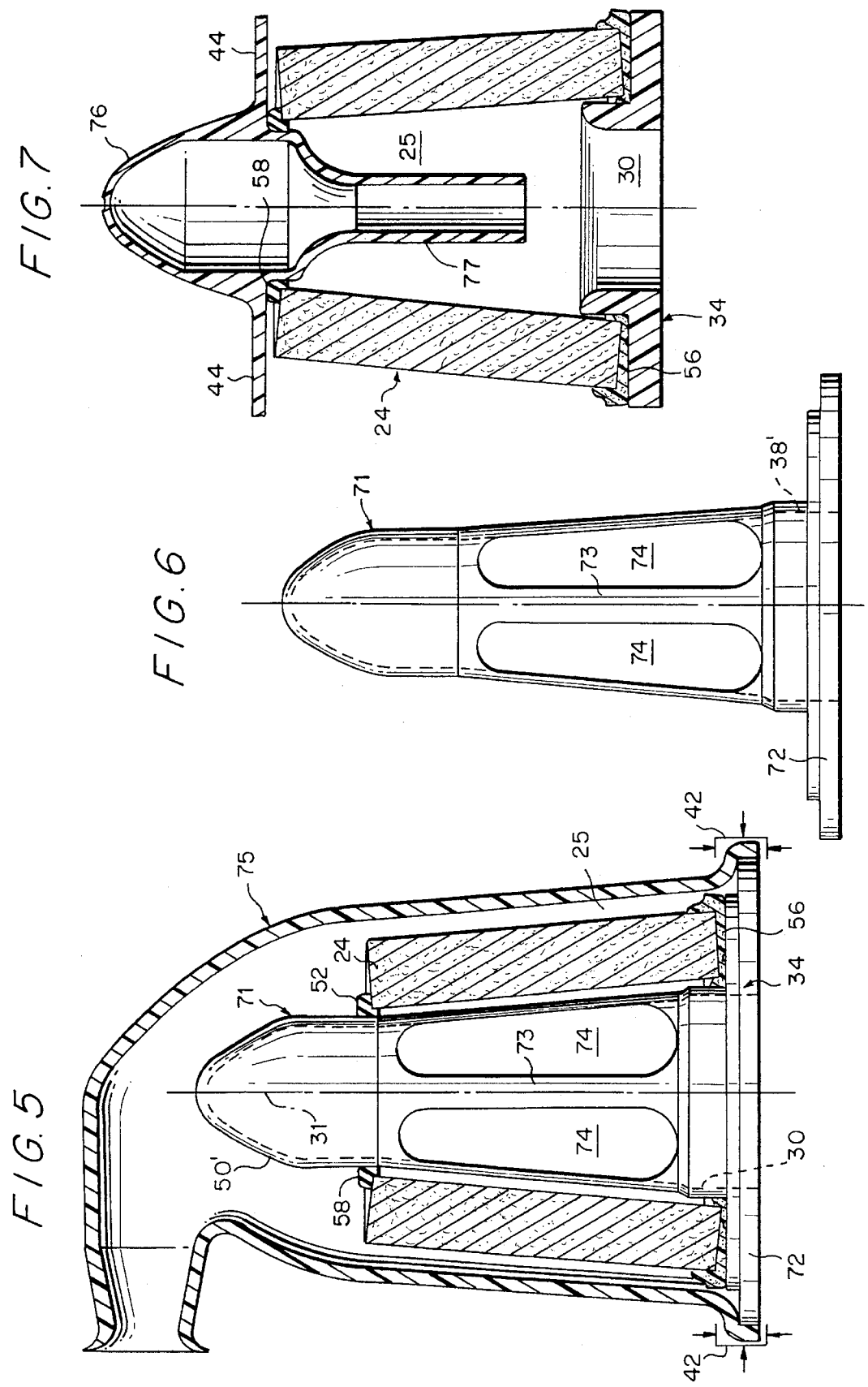

AIR FILTER ASSEMBLIES AND A FRUSTOCONICAL AIR FILTER ELEMENT FOR USE WITH THE ASSEMBLIES

FIELD OF THE INVENTION

The present invention is directed to air filter assemblies and a frustoconical air filter element for use therewith. More particularly, the present invention relates to an improvement in air filter housings and improvements in frustoconical filter elements utilized therewith.

BACKGROUND OF THE INVENTION

Currently, conical filter elements are mounted in conical filter housings in an arrangement in which the conical filter elements are restrained only at their bases with the small diameter ends of the conical filter elements being unrestrained. This, in effect, cantilevers the filter elements, allowing the filter elements to be affected by vibration. Since sealing between the filter elements and housings occurs at the base of the housing by radial surfaces which present axial faces, it is required that flatness of the housing bases be the same as that of the flanged seals of the filter element bases.

In the prior art, in order to close the free end of the frustoconical filter elements, nose cones are glued in the free ends of the filter elements. Because of the time and skill required to glue nose cones to the frustoconical filter elements, this arrangement has high manufacturing costs. It is also necessary to perform a mold spin operation to distribute urethane on the base flange of the filter elements to provide a layer of sealing material. In addition, the prior art arrangement requires that flash be trimmed from around the filter element bases. Furthermore, in the prior art, the filter element material cannot be oiled immediately after molding because it is necessary for glue adhering the nose cone to the filter to dry before oil is applied.

Since the frustoconical filter element itself is relatively expensive, the cost of the entire filter, including the filter housing, is increased. Moreover, in that air filters are a replacement item, an increase in the cost of air filters becomes a continuing expense to the vehicle owner and results in a tendency to perhaps not replace air filters as frequently as necessary. This results in engines which do not function as efficiently as they might if periodically equipped with a new air filter element. When this phenomenon is multiplied by tens of thousands of vehicles, the economic and environmental impacts are not inconsequential, especially when coupled with other possible inefficiencies.

SUMMARY OF THE INVENTION

It is a feature of the present invention to provide a new and improved air filter assembly and a new and improved frustoconical filter element for use therewith.

In one aspect, the invention is directed to a filter element having filter material configured as a frustoconical body having a hollow core with a radially facing and axially facing seal at the relatively wide base thereof and a radially facing seal at the relatively narrow top thereof.

In accordance with another aspect, the present invention is directed to an arrangement wherein an air filter housing has a frustoconical chamber with an inlet end and an outlet end in which a frustoconical filter element is mounted. Proximate the inlet end of the chamber, a nose cone diffuser is suspended, which diffuser has a rounded conical element that projects away from the chamber and an extension that projects into the chamber through the narrow end of the frustoconical filter element. The housing includes a base having a radially extending platform and an axially extending annular shoulder providing a radially facing sealing surface. The frustoconical filter element has a base of a first diameter and a top of a second diameter less than the first diameter with both the base and top having sealing material disposed thereon. The filter element is sealed with respect to the housing by both the annular shoulder at the base of the housing and the frustoconical projection proximate the inlet to the housing.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 2 is a side elevation of a first embodiment of a filter assembly configured in accordance with the principles of the present invention;

FIG. 3 is a top view of a cone diffuser used with the assembly of FIG. 3;

FIG. 4 is a side elevation of the cone diffuser of FIG. 3;

FIG. 5 is a side elevation of a second embodiment of the invention;

FIG. 6 is a side view of a combination cone diffuser and base used with the second embodiment of FIG. 5;

FIG. 7 is a side elevational view of a third embodiment of the invention;

DETAILED DESCRIPTION

Figure 1:
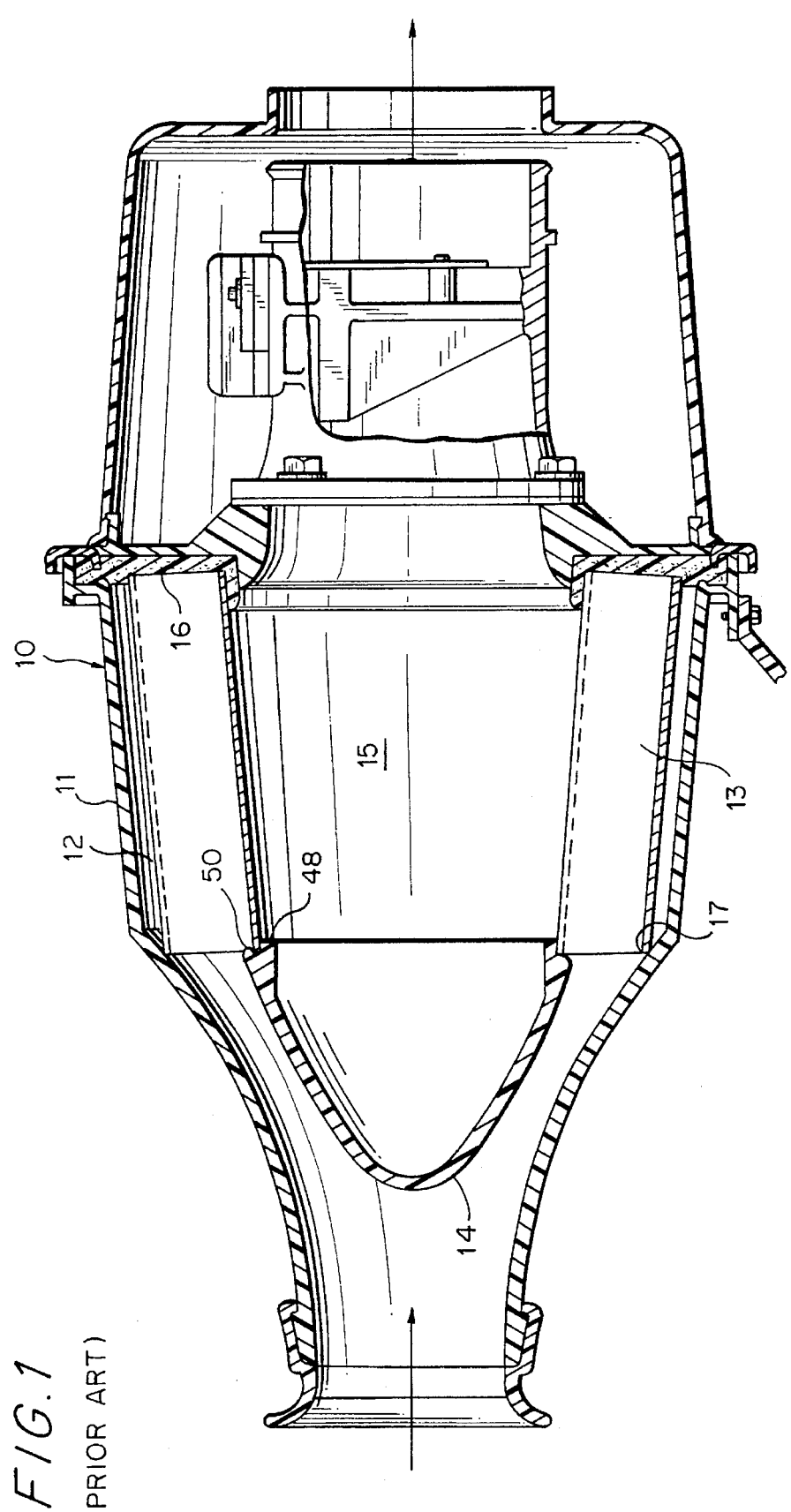
FIG. 1 is a side elevation of a prior art filter assembly.

Referring now to FIG. 1, there is shown a filter assembly 10 having the prior art configuration of U.S. Pat. No. 5,106,397 (incorporated herein by reference) in which a housing 11 having a conical chamber 12 retains a frustoconical filter element 13. The frustoconical filter element 13 has a conical nose 14 which is glued to one end of the filter element to close a hollow core 15 of the filter element 13. The filter element 13 is sealed within the housing 12 proximate its other end or base end with a urethane seal 16. With the prior art arrangement of FIG. 1, the end of the filter element 13 having the cone 14 is not positively restrained.

Referring now to the first embodiment of the present invention shown in FIGS. 2–4, a filter assembly 20 is configured in accordance with the principles of the present invention includes a filter housing 22 retaining a frustoconical filter element 24 having a hollow core 25 within a frustoconical chamber 27 of the housing. The housing 22 has an inlet 28 and an outlet 30 with at least the outlet 30 being axially aligned with the axis 31 of the frustoconical filter element 24. The housing 22 includes a removable portion 32 and a base portion 34 which is at least semipermanently fixed to the air inlet structure of an internal combustion engine. The base portion 34 has a radially extending, axially facing surface 36 thereon which extends radially with respect to the outlet 30 and an annular shoulder 38 which projects perpendicularly from the base 36 into the hollow core 25 of the filter 24.

The removable section 32 of the housing has an annular flange 40 which abuts the radial surface 36 and is clamped thereto by a conventional clamp 42. Disposed between the inlet 28 of the housing 22 and the frustoconical chamber 26 are three radially extending supporting ribs or webs 44 defining a plurality of openings 46 therebetween so that air may pass from the inlet 28 into the frustoconical chamber 27. Mounted by the webs 44 is a cone diffuser 50 (FIGS. 2 and 8) which is concentric with the axis 31 of the frustoconical filter element 24. The cone diffuser 50 smooths the air flow flowing into chamber 27. Projecting in the opposite direction of the diffuser 50 is an optional frustoconical projection or spike diffuser 52 shown in dotted lines in FIG. 2 and in full lines in FIG. 4. The spike diffuser 52 is received in the hollow core 25 of the frustoconical filter element 24 and helps smooth air flow within the hollow core to the outlet 30.

In practice, the filter element 24, which is replaceable when clogged or at selected time intervals, is provided with an annular base seal 56 and an annular top seal 58 which is mounted over an inner annular edge of the filter element 24. The annular base seal 56 has an axially extending, radially facing surface 60 which abuts an axially extending, radially facing surface 62 of the annular shoulder 38. The seal 56 also has a radially extending, axially facing surface 64 which abuts the radially extending, axially facing surface 36 of the housing base 34 so as to slightly deform the seal 56 when the filter element 24 is pressed against the radial surface 36.

The frustoconical filter element 24 is mounted on the radially extending surface 36 of the base 34 with the housing 32 removed. When the housing 32 is mounted on the housing base 34, the diffusion spike 52 is inserted through the annular top seal 58 as the removable portion of the housing 32 is pressed home. A cylindrical portion 69 of the spike 52 seals radially with the inner surface 70 of the annular seal 58 so as to radially seal thereagainst while urging the frustoconical filter element 24 against the radial platform 36 of the housing base 34. When the clamp 42 clamps the annular flange 40 of the removable portion 32 of housing 22 against the radial platform 36 of the housing base 34, the filter element 24 is securely held in place at both ends. Inlet air from the air inlet 28 then fills the annular space 27 defined by the frustoconical chamber 27 and flows radially through the filter element 24 into the core 25 of the filter and thereafter out of the outlet 30 in the base portion 34 of the housing 22.

The assemblies in accordance with the present invention may have a number of configurations. As is seen in FIGS. 5 and 6, a cone diffuser 71 unitary with a base 72 and is connected to the base by a hollow stanchion 73 with air inlet openings 74 for the passage of air through the stanchion into the outlet 30 of the housing base 72. With this embodiment, the filter element 24 is pressed down over the cone diffuser 71 and stanchion 73 and frictionally held thereagainst by the seal 58. A unitary housing 75 is then clamped to the base 72 with a clamp 42 in the manner of FIG. 2.

In the embodiment of FIG. 7, a cone diffuser 76 has a convexly tapered, insert portion 77 which extends into the hollow core 25 of the filter element 24. The cone diffuser 76 is otherwise similar to the cone diffuser 50 of FIG. 1 in that the cone diffuser 76 is secured to the housing 22 by webs 44.

Figure 8:
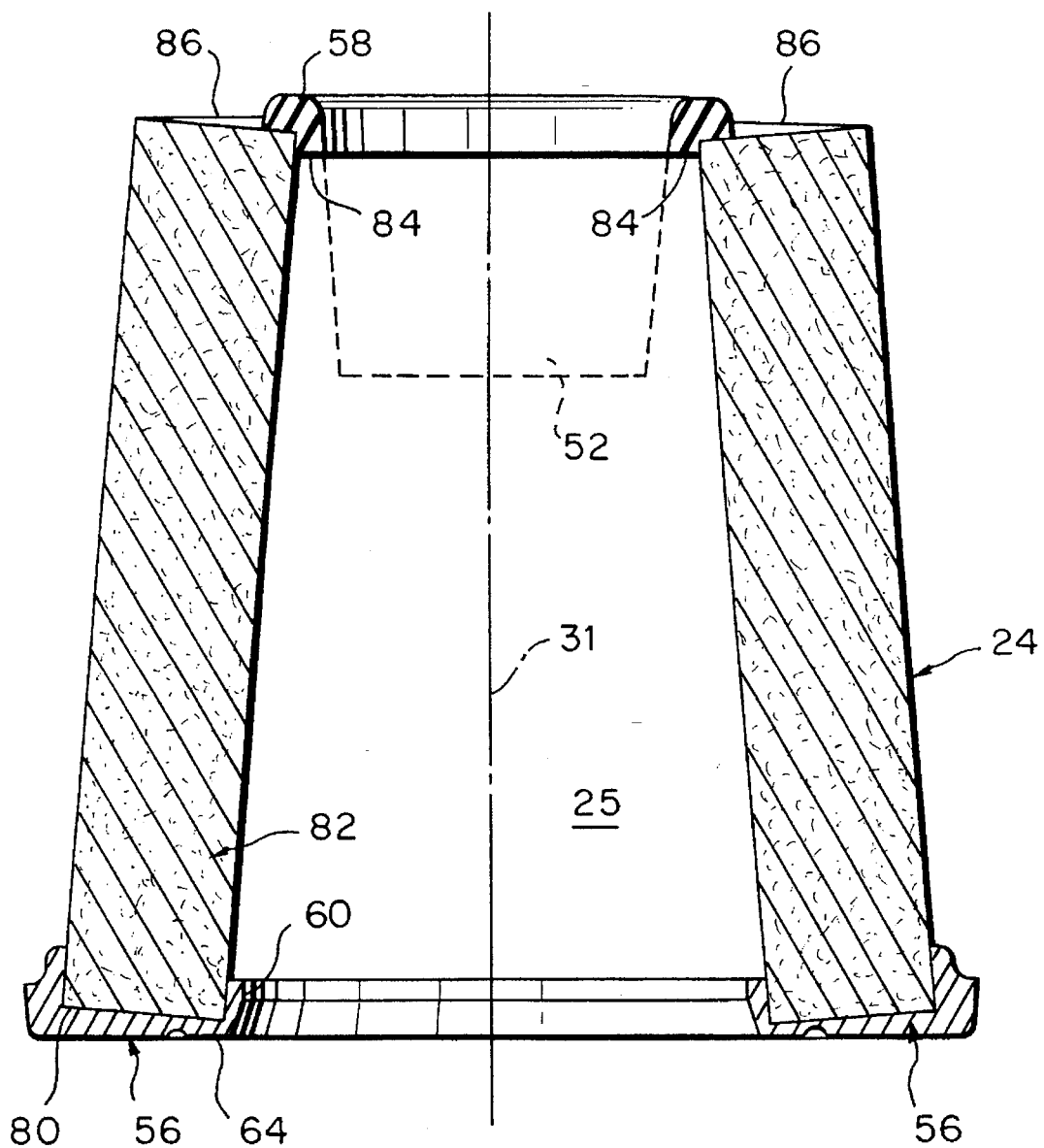
FIG. 8 is a side elevation of a conical filter element configured in accordance with the principles of the instant invention for use with the filter assemblies of FIGS. 2–7.
Figure 9:
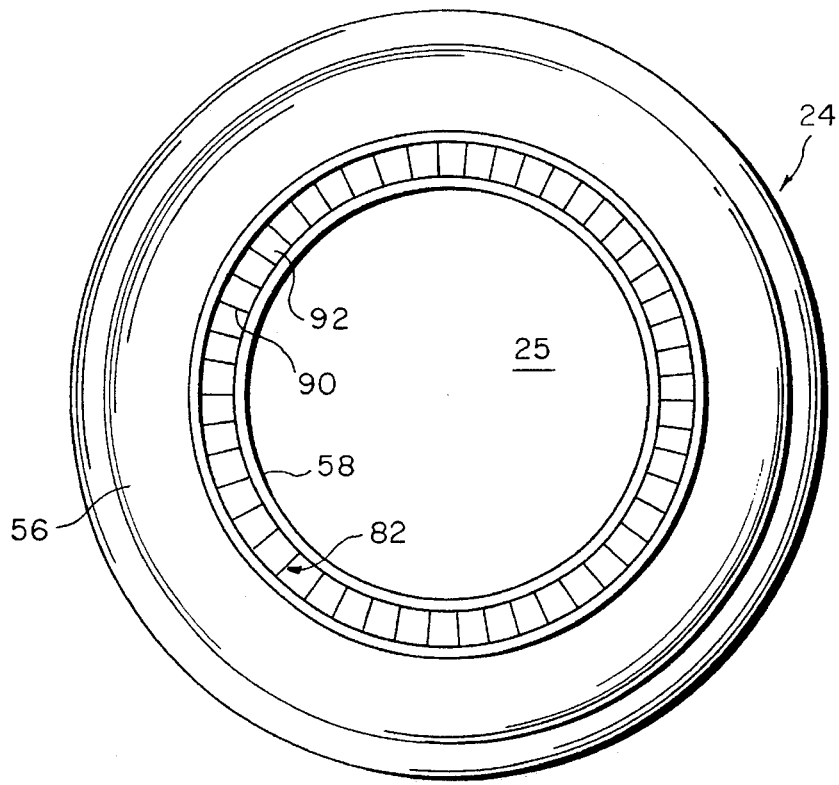
FIG. 9 is an end view of a narrow end of the filter element of FIG. 8.
Figure 10:
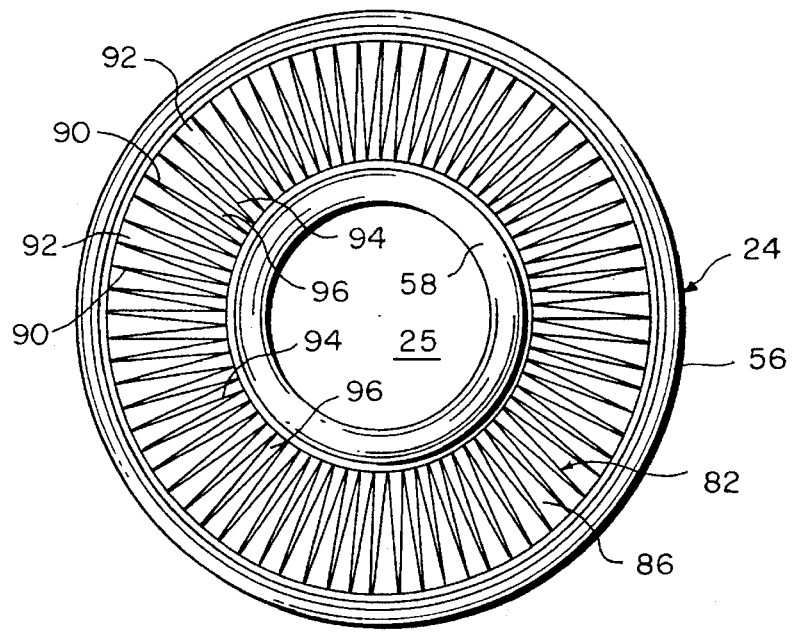
FIG. 10 is an end view of a wide end of the filter element of FIG. 8.

Referring now to FIGS. 8–10 in which the replaceable air filter element 24 is shown separate from the housing 22, it is seen that the base seal 56 is adhered to the bottom 80 of a frustoconical body of paper filter material 82. The seal 56 is generally U-shaped in cross-section and increases in thickness as it progresses outwardly from the inner radially facing surface 60. The annular seal 58 is positioned to overly the inner edge 84 of the filter material 82 with most of the upper end 86 of the filter material 82 being exposed.

Referring now to FIGS. 9–10, it is seen that the bottom 80 of the body of filter material 82 is completely enclosed by the seal 56 while the filter material 82 is configured as pleats 90 with spaces 92 therebetween. Accordingly, air can flow axially down the spaces 92 in the pleated material and through opposed surfaces 94 and 96 of each pleat 90 before moving radially through the opposed surfaces and into the hollow core 25 of the filter element 24.

The aforediscussed arrangements provide a filter element 24 which is both self aligning and stable within the housing 22. Moreover, the disclosed cone diffusers 50, 71 and 76 are molded to either the housing 22 or housing base 34, thus eliminating the need to glue the cone diffusers to the filter element 24.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a filter element made of paper filter material configured as body having pleats with spaces therebetween around a hollow core, the body being mounted within a filter housing, the improvement comprising:

the body being configured in a frustoconical shape having first and second ends with the first end having a diameter larger than the second end;

an annular seal, U-shaped in cross-section, encompassing the first end of the body of pleated material, the annular seal presenting an axially facing radially extending surface and an axially extending radially facing surface for forming a radial seal and an axial seal with the housing in which the filter element is mounted; and a second annular seal disposed at the second end of the body of pleated material, the second annular seal being disposed only over an inner annular edge of the second end of the body of pleated material and providing an axially extending, radially facing sealing surface for engaging sealing with a conical surface of a diffuser which forms part of the housing and extends axially into the hollow core of the filter element.

2. The filter element of claim 1, wherein the first and second seals are made of polyurethane and wherein the first and second seals are deformable in both the radial and axial directions to keep the filter element retained in sealing relationship within the housing.

3. A filter assembly comprising a housing having a housing base portion with a radially extending platform and a removable portion for mounting on the radially extending platform, wherein the base portion has an axially opening air outlet and the removable portion has an air inlet wherein a frustoconical filter element having first and second ends and a hollow core is retained within the removable portion of the housing while urged against the radially extending platform, the improvement comprising:

a wall within the removable housing, the wall including a diffusion cone extending away from the frustoconical filter element and at least an extension of the diffusion cone extending toward and within the hollow core of the frustoconical filter element;

an annular shoulder on the housing base portion projecting toward the removable portion of the housing to provide a radial sealing surface;

a first sealing member on the first end of the frustoconical filter element, the first sealing member having an axially facing, radially extending surface and a radially facing, axially extending surface; and an annular seal at the second end of the frustoconical filter element, the annular seal having a radially facing surface for engagement with the extension of the diffusion cone upon assembling the removable portion of the housing to the housing base portion, whereby the filter element is retained within the removable portion of the housing with the first sealing member and annular seal sealing off the hollow core of the filter element from the air inlet of the housing whereby air entering the housing flows through the filter element into the hollow core and out of the outlet of the housing.

4. The improvement of claim 3, wherein the removable portion of the housing has a radially extending flange which engages the radially extending platform of the housing base portion and wherein a clamp retains the removable portion of the housing on the housing base portion.

5. The improvement of claim 4, wherein the annular seal has a diameter less than the diameter of the radially extending flange extending from the removable portion of the housing whereby the annular flange directly engages the radially extending platform of the housing base portion without engaging the first sealing member.

6. The improvement of claim 5, wherein the first sealing member and the annular seal are made of polyurethane.

7. The improvement of claim 6, wherein the filter element is configured of pleats and the annular seal covers only a minor portion of the second end of the filter element whereby air flows both axially and radially with respect to the pleats of the filter element as it passes through the pleats into the hollow core of the filter element.

8. In a filter assembly comprising a housing having a housing base portion with a radially extending platform and a removable portion for mounting on the radially extending platform; wherein the base portion has an axially opening air outlet and the removable portion has an air inlet; wherein a conical filter element having first and second ends and a hollow core is retained within the removable portion of the housing while urged against the radial extending platform, the improvement comprising:

a stanchion fixed to the housing base portion and extending from the base portion through the hollow core of the frustoconical filter element, the stanchion having a diffusion cone at the free end thereof which diffuser cone extends beyond the filter element;

an annular shoulder on the housing base portion projecting toward the removable portion of the housing to provide a radial sealing surface;

a first sealing member on the first end of the frustoconical filter element, the first sealing member having an axially facing radially extending surface and a radially facing, axially extending surface;

an annular seal at the second end of the frustoconical filter element, the annular seal having a radially facing surface for engagement with the stanchion upon assembling the removable portion of the housing to the housing base portion whereby the filter element is retained within the removable portion of the housing with the first sealing member and annular seal sealing off the hollow core of the filter element from the air inlet of the housing, whereby air entering the housing flows through the filter element into the hollow core and out of the outlet of the outlet of the housing.

9. The improvement of claim 8, wherein the stanchion is hollow with air inlet openings which communicate with the outlet of the housing base portion.

10. The improvement of claim 8, wherein the first sealing member and annular seal are made of polyurethane.

11. The improvement of claim 8, wherein the stanchion is unitary with the housing base portion.

* * * * *